(12) United States Patent
McConnell et al.

(10) Patent No.: US 7,725,336 B2
(45) Date of Patent: May 25, 2010

(54) METHODS AND SYSTEMS OF INSURING FERTILITY CARE LIFESTYLE AFFAIRS

(76) Inventors: Rachel Ann McConnell, 10709 Grey Havens Ct., Las Vegas, NV (US) 89135; Salaheldin Eltigani Abdelgadir, 936 Las Palomas Dr., Las Vegas, NV (US) 89138

( * ) Notice: Subject to any disclaimer, the term of this patent is extended or adjusted under 35 U.S.C. 154(b) by 0 days.

(21) Appl. No.: 12/545,984

(22) Filed: Aug. 24, 2009

(65) Prior Publication Data

US 2010/0049555 A1 Feb. 25, 2010

Related U.S. Application Data

(60) Provisional application No. 61/136,274, filed on Aug. 22, 2008.

(51) Int. Cl.
*G06Q 40/00* (2006.01)
(52) U.S. Cl. .......................................................... 705/4
(58) Field of Classification Search ...................... 705/4
See application file for complete search history.

(56) References Cited

U.S. PATENT DOCUMENTS

| | | | |
|---|---|---|---|
| 6,347,634 B1 * | 2/2002 | Jancik, Jr. ................... | 128/899 |
| 6,569,093 B2 * | 5/2003 | Iliff ............................ | 600/300 |
| 6,886,740 B1 * | 5/2005 | Craig ....................... | 235/85 FC |
| 2003/0060688 A1 * | 3/2003 | Ciarniello et al. ........... | 600/300 |
| 2005/0010444 A1 * | 1/2005 | Iliff ............................... | 705/2 |
| 2007/0082329 A1 | 4/2007 | Williams et al. | |
| 2007/0162992 A1 * | 7/2007 | Burns .......................... | 800/21 |

* cited by examiner

*Primary Examiner*—James Kramer
*Assistant Examiner*—Lindsay M. Maguire
(74) *Attorney, Agent, or Firm*—Anthony Jerome Blackman

(57) ABSTRACT

Beneficiaries are registered by an insurance provider for an insurance coverage policy for fertility diagnosis and treatable infertility conditions using either manual or online registration applications over a communications network. Using, knowledge base systems, prospective beneficiary personal descriptor information is matched with terms and conditions information preloaded into the insurance company computer system to generate a customized contract for delivery of infertility treatment services to different categories of beneficiaries. Beneficiaries may range in age from newborn infants up to adults. However, infertility treatment services are not provided either until the beneficiaries reach childbearing age or until the policies of adult beneficiaries vest over a designated time period. Adults can purchase infertility insurance naming their infant child as beneficiary and pay premiums over time until the child reaches childbearing age. Once the child reaches childbearing age, the insurance policy can be utilized by the beneficiary or can be transferred.

1 Claim, 3 Drawing Sheets

METHODS AND SYSTEMS OF INSURING FERTILITY CARE LIFESTYLE AFFAIRS

RELATED APPLICATIONS

The present application is related to and claims benefit of priority pursuant to 35 USC §119(e) of prior filed provisional patent application 61/136,274, which is herein incorporated by reference in its entirety.

FIELD OF THE INVENTION

Exemplary embodiments generally relate to the healthcare and healthcare insurance industries. Further, the exemplary embodiments generally relate to computer systems management, data management, data mining, software services and application solutions. In particular, the invention provides systems and business methods of financing infertility diagnoses and infertility treatments.

BACKGROUND OF THE INVENTION

Infertility affects about 7.3 million people in the U.S. This amounts to between about 12% to 15% of persons in the reproductive age population. (Source: National Survey of Family Growth, CDC 2002). Requirements for the initiation of pregnancy include ovulation and the production of a competent oocyte (egg), production of competent sperm, proximity of the sperm and oocyte in the reproductive tract, fertilization, transport of the embryo into the uterine cavity and implantation of the embryo into the endometrium. Many disease processes contribute to infertility in humans. The World Health Organization task force on Diagnosis and Treatment of Infertility determined in developed countries, diseases that contributed to infertility were attributed to the female partner in 37% of couples, to the male partner in 8% of couples, and to both partners in 35% of couples. Five percent of the couples had no identifiable cause of infertility (i.e., unexplained infertility). Diseases in females most often identified included: ovulatory disorder (25%), pelvic adhesions (12%), tubal occlusion (11%) other tubal abnormalities (11%), hyperprolactinemia (7%), endometriosis (15%) and no identifiable diseases (20%). Decision by persons in the reproductive population to defer childbearing due to careers and other lifestyle factors are increasing the numbers of infertile couples. Over the past three decades, women have been choosing and will continue to choose to pursue higher education and careers and thus postpone marriage. Professional couples tend to get married at an older age and are continuing to delay having children, well into their late thirties up to their mid forties, because of changing life styles and career demands. These trends increase the need for fertility treatments. Also, alternative life styles, i.e., same sex couples, offer a major challenge to options in fertility treatments, which are not currently well recognized or addressed. Technology is continuing to advance in efforts to resolve infertility issues. Egg cryopreservation is becoming an option for women who may have medical conditions that will require treatments that may cause sterility. Also, egg cryopreservation may be beneficial to women who are delaying reproduction. Currently technology is being developed to give a female the opportunity to freeze oocytes (eggs) during the best time of her reproductive years; thus, providing the ability for these women to have children at a later time in life. Freezing of oocytes provides an opportunity not just for women who choose to delay having children but also for women who are diagnosed with cancer or other illness and who may require the use of radiation and/or chemotherapy which may leave the these women sterile. Currently there are gaps in services available, in regard to egg cryopreservation. However freezing of oocytes alone will not solve all of the potential future problems for these women. Assisted reproductive techniques and/or treatments with in vitro fertilization will be required for fertilization of frozen oocytes and the transfer of embryos into the uterus of these women to achieve a pregnancy.

The need for providing coverage for infertility treatment is huge and steadily increasing. As of 2002, infertility affected at least 7.3 million women and their partners in the United States. This is about 12% of the reproductive age population in the U.S. (Source: National Survey of Family Growth, CDC 2002). Of those affected, one third of infertility is due to male factors, one third is due to female factors and the other third is a combination of problems in both partners.

The most common causes of female infertility include fallopian tube damage or blockage, endometriosis, ovulation disorders, elevated prolactin, polycystic ovary syndrome (PCOS), early menopause, benign uterine fibroids and pelvic adhesions.

Fallopian tube damage usually results from inflammation of the fallopian tube (salpingitis). Chlamydia, a sexually transmitted disease, is the most frequent cause. Tubal inflammation may go unnoticed or cause pain and fever. Tubal damage is the major risk factor of a pregnancy in which the fertilized egg is unable to make its way through the fallopian tube to implant in the uterus (ectopic pregnancy). One episode of tubal infection may cause fertility difficulties. The risk of ectopic pregnancy increases with each occurrence of tubal infection.

Endometriosis occurs when the uterine tissue implants and grows outside of the uterus often affecting the function of the ovaries, uterus and fallopian tubes. These implants respond to the hormonal cycle and grow, shed and bleed in sync with the lining of the uterus each month, which can lead to scarring and inflammation. Pelvic pain and infertility are common in women with endometriosis.

Some cases of female infertility are caused by ovulation disorders. Hormonal disruptions in the part of the brain that regulates ovulation can cause low levels of luteinizing hormone (LH) and follicle-stimulating hormone (FSH). Even slight irregularities in the hormone system can affect ovulation. Specific causes of hypothalamic-pituitary disorders include injury, tumors, excessive exercise and starvation.

Elevated prolactin (hyperprolactinemia). The hormone prolactin stimulates breast milk production. High levels in women who aren't pregnant or nursing may affect ovulation. An elevation in prolactin levels may also indicate the presence of a pituitary tumor. In addition, some drugs can elevate levels of prolactin. Milk flow not related to pregnancy or nursing can be a sign of high prolactin.

Polycystic ovary syndrome (PCOS). In PCOS, the body produces too much androgen hormone, which affects ovulation. PCOS is associated with insulin resistance and obesity.

Early menopause (premature ovarian failure): Early menopause is the absence of menstruation and the early depletion of ovarian follicles before age 35. Although the cause is often unknown, certain conditions are associated with early menopause, including immune system diseases, radiation or chemotherapy treatment, and smoking.

Benign uterine fibroids. Fibroids are benign tumors in the wall of the uterus and are common in women in their 30s. Occasionally they may cause infertility by blocking the fallopian tubes.

Pelvic adhesions: Pelvic adhesions are bands of scar tissue that bind organs after pelvic infection, appendicitis, or abdominal or pelvic surgery. This scar tissue formation may impair fertility.

OTHER CAUSES: A number of other causes can lead to infertility in women:

Medications: Temporary infertility may occur with the use of certain medications. In most cases, fertility is restored when the medication is stopped.

Thyroid problems: Disorders of the thyroid gland, either too much thyroid hormone (hyperthyroidism) or too little (hypothyroidism), can interrupt the menstrual cycle and cause infertility.

Cancer and its treatment. Certain cancers particularly female reproductive cancers often severely impair female fertility. Both radiation and chemotherapy may affect a woman's ability to reproduce. Chemotherapy may impair reproductive function and fertility in men and women.

Other medical conditions: Medical conditions associated with delayed puberty or amenorrhea, such as Cushing's disease, sickle cell disease, HIV/AIDS, kidney disease and diabetes, can affect a woman's fertility.

Caffeine intake. Excessive caffeine consumption reduces fertility in the female.

TABLE 1

| Female Infertility | |
|---|---|
| Anovulation | 10 to 15% |
| Pelvic factor | 30 to 40% |
| Cervical factor | 10 to 15% |

Percentage of women who are infertile, by age from three national U.S. surveys:

TABLE 2

| | Age | | | | |
|---|---|---|---|---|---|
| | Under 30 | 30-35 | 36-40 | 41-45 | >45 |
| % with infertility after one year of trying | 20% | 20% | 33% | 66% | 95% |
| Miscarriage rate | 15% | 15% | 17% | 34% | 53% |

CAUSES OF MALE INFERTILITY: A number of things can cause impaired sperm count or mobility, or impaired ability of the sperm to fertilize the egg. The most common causes of male infertility include abnormal sperm production or function, impaired delivery of sperm, general health and lifestyle issues, and overexposure to certain environmental elements.

IMPAIRED PRODUCTION OR FUNCTION OF SPERM: Most cases of male infertility are due to problems with the sperm, such as:

Impaired shape and movement of sperm. Sperm must be properly shaped and able to move rapidly and accurately toward the egg for fertilization to occur. If the shape and structure (morphology) of the sperm are abnormal or the movement (motility) is impaired, sperm may not be able to reach or penetrate the egg.

Low sperm concentration. A normal sperm concentration is greater than or equal to 20 million sperm per milliliter of semen. A count of 10 million or fewer sperm per milliliter of semen indicates low sperm concentration (subfertility). A count of 40 million sperm or higher per milliliter of semen indicates increased fertility. Complete failure of the testicles to produce sperm is rare, affecting very few infertile men.

Varicocele: A varicocele is a varicose vein in the scrotum that may prevent normal cooling of the testicle, leading to reduced sperm count and motility.

Undescended testicle. Undescended testicle occurs when one or both testicles fail to descend from the abdomen into the scrotum during fetal development. Because the testicles are exposed to the higher internal body temperature, compared with the temperature in the scrotum, sperm production may be affected.

Testosterone deficiency (male hypogonadism). Infertility can result from disorders of the testicles themselves, or an abnormality affecting the hypothalamus or pituitary gland in the brain that produces the hormones that control the testicles.

Genetic defects. In the genetic defect Klinefelter's syndrome, a man has two X chromosomes and one Y chromosome instead of one X and one Y. This causes abnormal development of the testicles, resulting in low or absent sperm production and possibly low testosterone.

Infections. Infection may temporarily affect sperm motility. Repeated bouts of sexually transmitted diseases (STDs), such as chlamydia and gonorrhea, are most often associated with male infertility. These infections can cause scarring and block sperm passage. If mumps, a viral infection usually affecting young children, occurs after puberty, inflammation of the testicles can impair sperm production. Inflammation of the prostate (prostatitis), urethra or epididymis also may alter sperm motility.

In many instances, no cause for reduced sperm production is found. When sperm concentration is less than 5 million per milliliter of semen, genetic causes could be involved. A blood test can reveal whether there are subtle changes in the Y chromosome.

IMPAIRED DELIVERY OF SPERM: Problems with the delivery of sperm from the penis into the vagina can result in infertility. These may include:

Sexual issues. Often treatable, problems with sexual intercourse or technique may affect fertility. Difficulties with erection of the penis (erectile dysfunction), premature ejaculation, painful intercourse (dyspareunia), or psychological or relationship problems can contribute to infertility. Use of lubricants such as oils or petroleum jelly can be toxic to sperm and impair fertility.

Retrograde ejaculation. This occurs when semen enters the bladder during orgasm rather than emerging out through the penis. Various conditions can cause retrograde ejaculation including diabetes, bladder, prostate or urethral surgery, and the use of certain medications.

Blockage of epididymis or ejaculatory ducts. Some men are born with blockage of the part of the testicle that contains sperm (epididymis) or ejaculatory ducts. Some men lack the tube that carries sperm (vas deferens) from the testicle out to the opening in the penis.

No semen (ejaculate). The absence of ejaculate may occur in men with spinal cord injuries or diseases. This fluid carries the sperm from the penis into the vagina.

Misplaced urinary opening (hypospadias). A birth defect can cause the urinary (urethral) opening to be abnormally located on the underside of the penis. If not surgically corrected, this condition can prevent sperm from reaching the woman's cervix.

Anti-sperm antibodies. Antibodies that target sperm and weaken or disable them usually occur after surgical blockage of part of the vas deferens for male sterilization (vasectomy). Presence of these antibodies may complicate the reversal of a vasectomy.

Cystic fibrosis. Men with cystic fibrosis often have missing or obstructed vas deferens.

GENERAL HEALTH AND LIFESTYLE: A man's general health and lifestyle may affect fertility. Some common causes of infertility related to health and lifestyle include:

Emotional stress: Stress may interfere with certain hormones needed to produce sperm. The sperm count may be affected by excessive or prolonged emotional stress. A problem with fertility itself can sometimes become long term and discouraging, producing more stress. Infertility can affect social relationships and sexual functioning.

Malnutrition: Deficiencies in nutrients such as vitamin C, selenium, zinc and folate may contribute to infertility.

Obesity: Increased body mass may be associated with fertility problems in men.

Cancer and its treatment: Both radiation and chemotherapy treatment for cancer can impair sperm production, sometimes severely. The closer radiation treatment is to the testicles, the higher the risk of infertility. Removal of one or both testicles due to cancer also may affect male fertility.

Alcohol and drugs: Alcohol or drug dependency can be associated with poor health and reduced fertility. The use of certain drugs also can contribute to infertility. Anabolic steroids, for example, which are taken to stimulate muscle strength and growth, can cause the testicles to shrink and sperm production to decrease.

Other medical conditions: A severe injury or major surgery can affect male fertility. Certain diseases or conditions, such as diabetes, thyroid disease, Cushing's syndrome, or anemia may be associated with infertility.

Age. A gradual decline in fertility is common in men older than 35.

ENVIRONMENTAL EXPOSURE: Overexposure to certain environmental elements such as heat, toxins and chemicals can reduce sperm count either directly by affecting testicular function or indirectly by altering the male hormonal system. Specific causes include:

Pesticides and other chemicals: Herbicides and insecticides may cause female hormone-like effects in the male body and may be associated with reduced sperm production and testicular cancer. Lead exposure may also cause infertility.

Overheating the testicles: Frequent use of saunas or hot tubs can elevate the core body temperature. This may impair sperm production and lower sperm count.

Substance abuse: Use of cocaine or marijuana may temporarily reduce the number and quality of sperm.

Tobacco smoking: Men who smoke may have a lower sperm count than those who don't smoke.

SOCIAL TRENDS AS CAUSES OF INFERTILITY: In addition, social trends of deferred childbearing have increased in the past three decades due to men and women pursuing higher education and careers and thus marriage has been postponed to a latter age. Professional couples tend to get married at an older age and are continuing to delay having children well into their late thirties to mid forties because of changing life styles and career demands. These drastically increase the need for infertility treatments due to advanced maternal age. Often times, these treatments call for the employment of cutting-edge techniques such as in vitro fertilization (IVF), intracytoplasmic sperm injection (ICSI), preimplantation genetic diagnosis (PGD), embryo and sperm cryopreservation and storage as well as alternative treatments such as egg, sperm, and embryo donations and surrogate carriers for those who lost the ability to successfully carry the pregnancy. Also, alternative life styles (same sex couples) offer a major challenge to options in infertility treatments that are currently not well recognized or addressed.

TABLE 3

Male Infertility

| Male | 30 to 40% |
|---|---|

TABLE 4

Male and Female Infertility

| Unexplained infertility | 10% |
|---|---|

TABLE 5

Population of the United States

| Age | Year 2000 | Year 2010 |
|---|---|---|
| 0-4 | 19,175,798 | 21,426,163 |
| 5-9 | 20,549,905 | 20,705,845 |
| 10-14 | 20,528,072 | 19,767,291 |
| 15-19 | 20,219,890 | 21,336,475 |

State Infertility Insurance Benefits and Laws

Currently there are only fourteen states that require insurers to either cover or offer to cover some form of infertility diagnosis and treatment. Those states are Arkansas, California, Connecticut, Hawaii, Illinois, Maryland, Massachusetts, Montana, New Jersey, New York, Ohio, Rhode Island, Texas and West Virginia. Fertility insurance coverage in most if not all of these states is limited in scope and does not encompass the full range of options available for infertility treatments. In addition, the Employment Retirement Income and Security Act of 1974 exempts companies that self-insure from state regulation. These insurers are under heavy pressure to curtail and further reduce fertility coverage, treatments and benefits. These State mandated insurers are for the most part limited and deficient. Following is a description of the laws that govern how these states cover fertility insurance.

ARKANSAS: Arkansas law requires all health insurers that cover maternity benefits to cover the cost of IVF. Health maintenance organizations are exempt from the law. Patients need to meet the following conditions in order to get IVF coverage:

The patient must be the policyholder or the spouse of the policyholder and be covered by the policy;

The patient's eggs must be fertilized with her spouse's sperm;

The patient and her spouse must have at least a two-year history of unexplained infertility, OR the infertility must be associated with one or more of the following conditions:

Endometriosis: Fetal exposure to diethylstilbestrol, also known as DES;

Blocked or surgically removed fallopian tubes that are not a result of voluntary sterilization; or Abnormal male factors contributing to the infertility. The patient has not been able to achieve a successful pregnancy through any other less costly infertility treatment for which coverage is available under the policy.

IVF procedure must be performed at a medical facility licensed or certified by the Arkansas Department of Health. Those facilities certified by the Department of Health must conform to the American College of Obstetricians and Gynecologists guidelines for in vitro fertilization clinics or meet the American Fertility Society's (sic) minimal standards for programs of in vitro fertilization.

The IVF benefits in Arkansas are subject to the same deductibles and co-insurance payments as maternity benefits. The law also permits insurers to limit coverage to a lifetime maximum of $15,000. (Arkansas Statutes Annotated, Sections 23-85-137 and 23-86-118).

CALIFORNIA: California law requires certain insurers to offer coverage for infertility diagnosis and treatment. That means group health insurers covering hospital, medical or surgical expenses must let employers know infertility coverage is available. However, the law does not require those insurers to provide the coverage; nor does it force employers to include it in their employee insurance plans.

California law defines infertility as: The presence of a demonstrated condition recognized by a licensed physician and surgeon as a cause of infertility; or the inability to conceive a pregnancy or carry a pregnancy to a live birth after a year or more of sexual relations without contraception.

California law defines treatment as including, but not limited to:
Diagnosis and diagnostic tests;
Medication;
Surgery; and Gamete Intrafallopian Transfer, also known as GIFT.

California law specifically exempts insurers from having to offer IVF coverage. Also, the law does not require employers that are religious organizations to offer coverage for treatment that conflict with the organization's religious and ethical purposes. (California Health and Safety Code, Section 1374.55).

CONNECTICUT: Individual and group health insurance policies are required to cover medically necessary expenses for infertility diagnosis and treatment. Infertility is defined as the inability to conceive or sustain a successful pregnancy during a one-year period.

Covered treatments include ovulation induction, interuterine insemination, IVF, uterine embryo lavage, embryo transfer, GIFT, ZIFT, and low tubal embryo transfer. Coverage is limited to individuals who have maintained coverage under the policy for at least a year.

Some additional limitations apply: The covered individual must be under 40 years of age;

There is a life-time coverage maximum of four cycles of ovulation induction, three cycles of IUI, and two cycles of IVF, GIFT, ZIFT, or low tubal embryo transfer (with not more than two embryo transfers per cycle);

Covered treatments must be performed at facilities that conform to standards and guidelines developed by ASRM or SREI.

Individuals seeking coverage must disclose to their insurance carrier any prior infertility treatments for which they received coverage under a different insurance policy. Religious employers are permitted to exclude coverage for treatments that are contrary to their bona fide religious tenets. (Public Act No. 05-196).

HAWAII: Hawaii law requires certain insurance plans to provide a one-time only benefit for outpatient costs resulting from in vitro fertilization. Those plans include individual and group health insurance plans, hospital contracts or medical service plan contracts that provide pregnancy-related benefits. Patients need to meet the following conditions in order to get their IVF covered:

The patient's eggs must be fertilized with her spouse's sperm;

The patient or the patient's spouse must have at least a five-year history of infertility;

The patient has been unable to get and stay pregnant through other infertility treatments covered by insurance;

The IVF is performed at medical facilities that conform to standards set by the American Society for Reproductive Medicine or the American College of Obstetricians and Gynecologists; and The infertility must be associated with one or more of the following conditions:
Endometriosis;
Fetal exposure to diethylstilbestrol, also known as DES;
Blocked or surgically removed fallopian tubes; or Abnormal male factors contributing to the infertility. (Hawaii Revised Statutes, Sections 431-1OA-116.5 and 432.1-604).

ILLINOIS: Illinois law requires insurance policies that cover more than 25 people and provide pregnancy-related benefits to cover costs of the diagnosis and treatment of infertility. The law defines infertility as the inability to get pregnant after one year of unprotected sex or the inability to carry a pregnancy to term.

Coverage includes, but is not limited to:
In vitro fertilization (IVF);
Uterine embry lavage;
Embryo transfer;
Artificial insemination;
Gamete intrafallopian transfer (GIFT);
Zygote intrafallopian transfer (ZIFT);
Intracytoplasmic Sperm Injection (ICSI);
Four completed egg retrievals per lifetime; and Low tubal egg transfer.

Coverage for IVF, GIFT and ZIFT is required only if:
The patient has used all reasonable, less expensive and medically appropriate treatments and is still unable to get pregnant or carry a pregnancy;

The patient has not reached the maximum number of allowed egg retrievals;

The procedures are performed at facilities that conform to standards set by the America Society for Reproductive Medicine or the American College of Obstetricians and Gynecologists.

Illinois law exempts religious organizations which believe the covered procedures violate their teachings and beliefs. (Illinois Compiled Statutes Annotated, Chapter 215, Sections 5/356m and 125/5-3).

MARYLAND: Maryland law requires health and hospital insurance policies issued or delivered in Maryland that provide pregnancy-related benefits to also cover the outpatient costs of in-vitro fertilization. HMO's must provide IVF benefits to the same extent as the benefits provided for other infertility services.

Patients need to meet the following conditions in order to get their IVF covered:

The patient's eggs must be fertilized with her spouse's sperm;

The patient is unable to get pregnant through less expensive covered treatments;

The IVF is performed at facilities that conform to standards set by the American Society for Reproductive Medicine or the American College of Obstetricians and Gynecologists.

The patient and his or her spouse must have at least a two-year history of infertility; OR their infertility must be associated with one or more of the following conditions:
Endometriosis;
Fetal exposure to diethylstilbestrol, also known as DES;
Blocked or surgically removed fallopian tubes; or
Abnormal male factors, including oligozoospermia.

Coverage may be limited to three in vitro fertilization attempts per live birth and a maximum lifetime benefit of $100,000.

A religious organization may, by request have this coverage excluded from its policies and contracts if the required coverage conflicts with its bona fide religious beliefs and practices.

Regulations that took effect in 1994 exempt businesses with 50 or fewer employees from having to provide the IVF coverage. (Maryland Insurance Article §15-810, Health General Article §19-706).

MASSACHUSETTS: Massachussettes law requires health maintenance organizations and insurance companies that cover pregnancy-related benefits to cover medically necessary expenses of infertility diagnosis and treatment. The law defines infertility as "the condition of a presumably healthy individual who is unable to conceive or produce conception during a one-year period."

Benefits covered include:
Artificial insemination;
In vitro fertilization;
Gamete Intrafallopian Transfer;
Sperm, egg and/or inseminated egg retrieval, to the extent that those costs are not covered by the donor's insurer;
Intracytoplasmic Sperm Injection (ICSI) for the treatment of male infertility; and
Zygote Intrafallopian Transfer (ZIFT).

Insurers may, but are not required, to cover experimental procedures, surrogacy, reversal of voluntary sterilization or cryopreservation of eggs. (Annotated Laws of Massachusetts, Chapters 175, §47H; 176A, §8K; 176B, §4J; and 176G, §4, 211 CMR 37.00).

MONTANA: Montana law requires health maintenance organizations to cover infertility services as part of basic preventive health care services. The law does not define infertility or the scope of services covered; nor did the state ever draft regulations explaining what infertility services entail.

As for health insurers other than HMOs, the law specifically excludes infertility coverage from the required scope of health benefits those insurers must provide. (Montana Code Annotated, Sections 33-22-1521 and 33-31-102).

NEW JERSEY: New Jersey Family Building Act requires insurance policies that cover more than 50 people and provide pregnancy-related benefits to cover the cost of the diagnosis and treatment of infertility. The law defines infertility as the disease or condition that results in the inability to get pregnant after two years of unprotected sex (female partner under the age of 35) or one year of unprotected sex (female partner over the age of 35) or the inability to carry a pregnancy to term.

Coverage includes, but is not limited to:
Diagnosis & diagnostic tests
Medications
Surgery
In vitro fertilization (IVF)
Embryo transfer
Artificial insemination
Gamete intra fallopian transfer (GIFT)
Zygote intra fallopian transfer (ZIFT)
Intracytoplasmic Sperm Injection (ICSI)
Four completed egg retrievals per lifetime Coverage for IVF, GIFT and ZIFT is required only if: The patient has used all reasonable, less expensive and medically appropriate treatments and is still unable to get pregnant or carry a pregnancy; The patient has not reached the maximum number of allowed egg retrievals and the patient is 45 years of age or younger.

The procedures are performed at facilities that conform to standards set by the American Society for Reproductive Medicine or the American College of Obstetricians and Gynecologists.

The law allows religious organizations to request an exclusion of this coverage if it is contrary to the religious employer's bona fide religious tenets. (New Jersey Permanent Statutes: 17B:27-46.1X Group Health Insurance Policies; 17:48A-7W Medical Service Corporations; 17:48-6X Hospital Service Corporations; 17:48 E-35.22 Health Service Corporations; 26:2 J-4.23 Health Maintenance Organizations)

NEW YORK: Insurers are required to cover the diagnosis and treatment of correctable medical conditions and shall not exclude coverage of a condition solely because the medical condition results in infertility. Private, group health insurance plans, issued or delivered in the state of New York providing coverage for hospital care or surgical and medical care are required to provide coverage for the diagnosis and treatment of infertility for patients between the ages of 21 and 44, who have been covered under the policy for at least 12 months. Certain procedures are excluded from this requirement, including IVF, GIFT, ZIFT, reversal of elective sterilization, sex change procedures, cloning, and experimental procedures. Plans that include coverage for prescription drugs must include coverage of drugs approved by FDA for use in diagnosis and treatment of infertility. (New York Consolidated Laws, Insurance, Section 3221(k)(6), Section 4303(s).)

OHIO: Ohio law requires health maintenance organizations to cover basic preventive health services, including infertility. The Ohio Insurance Department has no written definition of infertility services, but states that the procedure must be medically necessary. Experimental procedures are not covered. (Ohio Revised Code Annotated §1751) 1742 was repealed and replaced and the $2,000 General Interpretation no longer applies.

RHODE ISLAND: Rhode Island law requires insurers and HMO's that cover pregnancy services to cover the cost of medically necessary expenses of diagnosis and treatment of infertility. The law defines infertility as "the condition of an otherwise healthy married individual who is unable to conceive or produce conception during a period of one year. The patient's co-payment cannot exceed 20 percent. (Rhode Island General Laws (§27-18-30, 27-19-23, 27-20-20 and 27-41-33).

TEXAS: Texas law requires certain insurers that cover pregnancy services to offer coverage for in vitro fertilization. That means insurers must let employers know this coverage is available. However, the law does not require those insurers to provide the coverage; nor does it force employers to include it in their health plans. Patients need to meet the following conditions in order to get their IVF covered:

The patient must be the policyholder or the spouse of the policyholder and be covered by the policy;

The patient's eggs must be fertilized with her spouse's sperm;

The patient has been unable to get and stay pregnant through other infertility treatments covered by insurance;

The IVF is performed at medical facilities that conform to standards set by the American Society for Reproductive Medicine or the American College of Obstetricians and Gynecologists; and The patient and her spouse must have at least a continuous five-year history of unexplained infertility, OR the infertility must be associated with one or more of the following conditions:

Endometriosis.
Fetal exposure to diethylstilbestrol (DES);
Blocked or surgical removal of one or both fallopian tubes; or Oligospermia.

Texas law does not require organizations that are affiliated with religious groups to cover treatment that conflicts with the organization's religious and ethical beliefs. (Texas Insurance Code, Article 3.51-6).

WEST VIRGINIA: West Virginia law requires health maintenance organizations to cover basic health care services, including infertility services, when medically necessary. The West Virginia Insurance Commissioner does not define infertility services. (West Virginia Code §33-25A-2).

TABLE 6

STATE INFERTILITY COVERAGE AT A GLANCE
(OCTOBER 2005)

| State | Date enacted | Mandate to cover | Mandate to offer | Includes IVF coverage | Excludes IVF coverage | IVF coverage ONLY |
|---|---|---|---|---|---|---|
| Arkansas | 1987 | X[1] | | | | X |
| California | 1989 | | X | | X[2] | |
| Connecticut | 1989 | X | | X | | |
| Hawaii | 1987 | X | | | | X[3] |
| Illinois | 1991 | X | | X[4] | | |
| Maryland | 1985 | X[5] | | | | X |
| Massachusetts | 1987 | X | | X | | |
| Montana | 1987 | X[6] | | | | |
| New Jersey | 2001 | X | | X | | |
| New York | 1990 | | | | X[7] | |
| Ohio | 1991 | X[8] | | | | |
| Rhode Island | 1989 | X | | X | | |
| Texas | 1987 | | X | | | X |
| West Virginia | 1977 | X[8] | | | | |

[1] Includes a lifetime maximum benefit of not less than $15,000.
[2] Excludes IVF, but covers gamete intrafallopian transfer (GIFT).
[3] Provides a one-time only benefit covering all outpatient expenses arising from IVF.
[4] Limits first-time attempts to four oocyte retrievals. If a child is born, two complete oocyte retrievals for a second birth are covered. Businesses with 25 or fewer employees are exempt from having to provide the coverage specified by the law.
[5] Businesses with 50 or fewer employees do not have to provide coverage specified by law.
[6] Applies to HMOs only; other insurers specifically are exempt from having to provide the coverage.
[7] Provides coverage for the diagnosis and treatment of correctable medical conditions. Does not consider IVF a corrective treatment.
[8] Applies to HMOs only.

It is evident from the above that of the fourteen states which require insurers to either cover, or offer to cover some form of infertility diagnosis and treatment, provide, for the most part limited and deficient benefits that will be exhausted in a short time, often with many restrictions and conditions attached. At the national level, in states other than the fourteen states mentioned above, the majority of medical insurance plans don't cover infertility benefits at all. In today's difficult environment, where tough choices must be made by medical insurers to provide maximum health benefits at a minimum cost, it is expected that even the limited and deficient infertility benefits available today will be further reduced and curtailed.

In 2002, one percent of the babies born in the United States were conceived, based on assisted reproductive technology treatments. Some insurance companies currently assist in initial fertility evaluations of couples seeking to have children; these evaluations include: semen analysis, documentation of competent ovulation and documentation of tubal patency; however, such evaluations are costly. In addition, the costs associated with infertility treatments are very expensive. Few insurance companies provide insurance coverage and/or assistance for couples who contract with or who intend to contract with medical providers who perform the specialized medical procedures comprising infertility treatments either in the United States or outside of the jurisdiction of the United States. Currently, people who do not have coverage for infertility treatments will need to apply for loans with very high interest rates, or take out home equity loans to obtain funds to pay for infertility treatments. Not only is the high cost of treating infertility prohibitive, but also the prohibitive nature of the costs generate significant stress for couples seeking infertility treatments; and this stress can cause relationships of some frustrated couples to end in separation and/or divorce. There are no known comprehensive financial services and/or products that support or provide insurance coverage for all of the potentially required fertility diagnoses and infertility treatments and options.

Therefore, the need exists for the provision of comprehensive methods and systems for providing and paying for insurance coverage of treatable infertility conditions that affect at least 7.3 million women and their partners (12% of the reproductive age population) in the United States.

Furthermore, the need exists for the provision of affordable payment options and payment plans for insurance coverage of treatable infertility conditions. In addition, the need exists for computer implemented, automated business methods and systems of providing insurance coverage of treatable infertility conditions, so as to reduce emotional and financial stress for patients, health care providers and insurance providers, interested in the delivery of infertility treatments and services. Thus, the focus of this invention is to provide insurance coverage for infertility treatments for individuals in a disciplined manner, enabling individuals to set aside money to address future issues that may interfere with them or their children or grandchildren giving birth to offspring. An additional focus of this invention is to assure that the best available technology is employed to provide a wide comprehensive spectrum of innovative fertility treatments and options to those seeking childbirth. Ultimately, the invention provides leadership in the field of providing financial products for fertility treatments in reproductive medicine, including male and female infertility treatments and to advance knowledge and technology in the science and practice of reproductive medicine.

Additionally, there can be a plurality of income streams associated with various incentives, bonuses and options, in regard to insurance coverage for infertility treatment. This invention can be used by any number of insurance carries and underwriters on a for fee basis. The insurance carriers and/or underwriters can provide incentives to other insurers and underwriters, in order to promote the income generation capabilities of a comprehensive fertility insurance program in various jurisdictions throughout the United States. However, the main income associated with the fertility insurance program will be from the premiums paid by the purchasers of the comprehensive fertility insurance policies.

SUMMARY OF THE INVENTION

A method of providing an insurance coverage policy for treatable infertility conditions is implemented in computer executable program code residing in a storage medium communicatively coupled to a processor. Upon execution of the program code by the processor, the program code causes the processor to perform the following operations, procedures and methods.

In a receiving operation, the processor receives a signal requesting initiation of the program code to register one or more individuals from a plurality of individuals as either a beneficiary or as two or more beneficiaries for the insurance coverage policy for treatable infertility conditions.

In a pre-negotiating operation, conducted by the fertility insurance system, infertility treatment and payment terms and conditions are negotiated with a plurality of physicians in communication with the processor over a communications network.

In a first storing operation, conducted by the fertility insurance system, the negotiated infertility treatment and payment terms and conditions are stored in a dynamic repository under the direction of the processor.

In a first contracting operation, contracts are executed, by the fertility insurance system and by the plurality of physicians forming a network of physicians for performing infertility treatment to patient beneficiaries of the insurance coverage policy for treatable infertility conditions, wherein contracting is performed by either the processor or by an automated wizard program, operating on the processor as part of the computer executable program code executing in the processor, or an agent of the insurance company and/or companies accessing and/or using the processor.

In a registering operation, a plurality of individuals seeking to participate in the insurance coverage policy for treatable infertility conditions, are sent marketing information and questionnaires and applications requesting personal descriptor data to be completed online or manually and returned to the insurance company processor for registration as beneficiaries by the fertility insurance system.

In a second storing operation, personal descriptor data from the completed applications and questionnaires are stored in the dynamic repository of the processor for subsequent use by the program running on the processor.

In a determining operation, a knowledge base system software application executing on the fertility insurance system is used to generate a plurality of categories of fertility insurance coverage for the plurality of beneficiaries and determine whether matching exists between the plurality of categories of fertility insurance coverage and personal descriptor data of individuals seeking to participate in the fertility insurance coverage. The categories of fertility insurance are automatically learned, generated and stored in the dynamic repository by the knowledge base system, based on retrieval and analysis of the treatment and payment terms and conditions and the personal descriptor data of individuals seeking to participate in the fertility insurance coverage, already stored in the dynamic repository, and when matching of categories of fertility insurance and personal descriptor data is determined not to exist, the computer executable program code causes the processor to continue registering the plurality of beneficiaries and storing additional personal descriptor data in the dynamic repository.

In a negotiating operation, acceptable infertility treatment and payment terms and conditions are negotiated with either the plurality of beneficiaries or an agent or a promissory of any one of the plurality of beneficiaries, when matching of categories of fertility insurance and personal descriptor data is determined to exist. When negotiating beneficiary treatment and payment terms and conditions is not successful, the computer executable program code causes the processor to further determine whether matching of categories of fertility insurance and personal descriptors exists and further registering beneficiaries and storing personal descriptor data and further negotiating beneficiary treatment and payment terms.

In an accepting operation, when negotiations are completed and terms and conditions are acceptable to the insurance company and the beneficiary and/or the agent of the beneficiary, the insurance company and the beneficiary and/or agent of the beneficiary bilaterally accept and execute a contract for the fertility insurance policy, and the insurance company accepts ratification of the contract by the beneficiary, when the policy vests.

In a coordinating operation, the processor directed by the computer executable program code, coordinates providing infertility treatment to the plurality of beneficiaries by any one or more of the plurality of physicians in the network of infertility treatment providers, by generating a signed contract for the insurance coverage policy for infertility treatment conditions and sending the signed contract electronically and/or by hardcopy paper to either the beneficiary, the agent of the beneficiary and/or the agent of the beneficiary and/or one or more physicians providing infertility treatment and then storing the contract for later usage on the fertility insurance system. The coordinating operation is performed by either the processor or the automated wizard program, executing on the processor as part of the computer executable program code directing the processor or the agent of the insurance company using the processor. Further, coordinating includes collecting payment from the beneficiary or the agent and/or promissory of the beneficiary, and/or coordinating payment to the fertility care providers, and where the beneficiary can be a third party beneficiary, such as an infant who will not receive the benefit of the fertility insurance policy until he or she reaches the age of majority and ratifies the contract for fertility insurance.

DETAILED DESCRIPTION OF THE EXEMPLARY EMBODIMENTS

Figure 1:
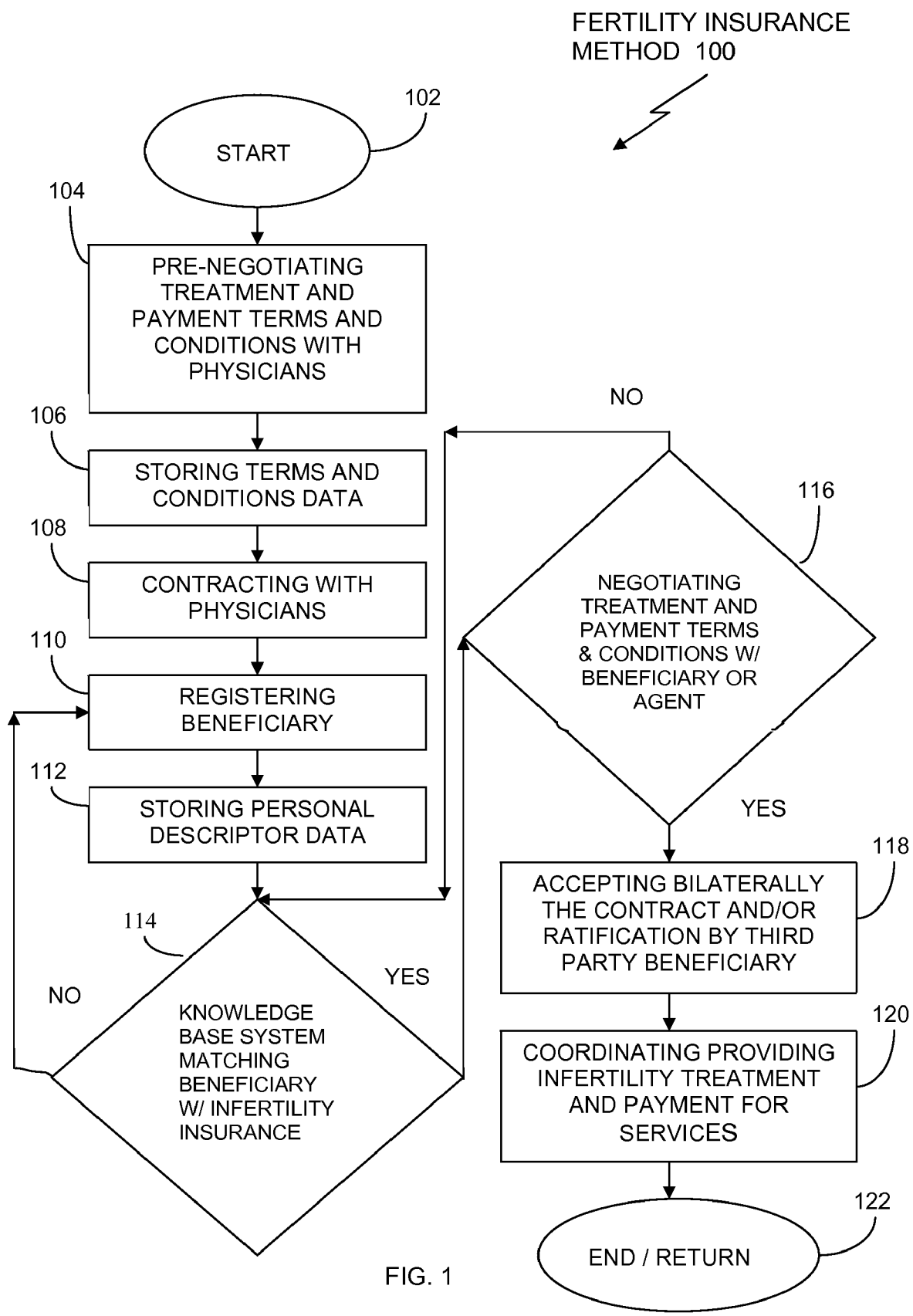
FIG. 1 illustrates a fertility insurance method.

Preferred exemplary embodiments of the present invention are now describes with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that this invention can also be employed in other applications. Further, the terms "a", "an", "first", "second" and "third" etc. used herein do not denote limitations of quantity, but rather denote the presence of one or more of the referenced item(s).

Figure 2:
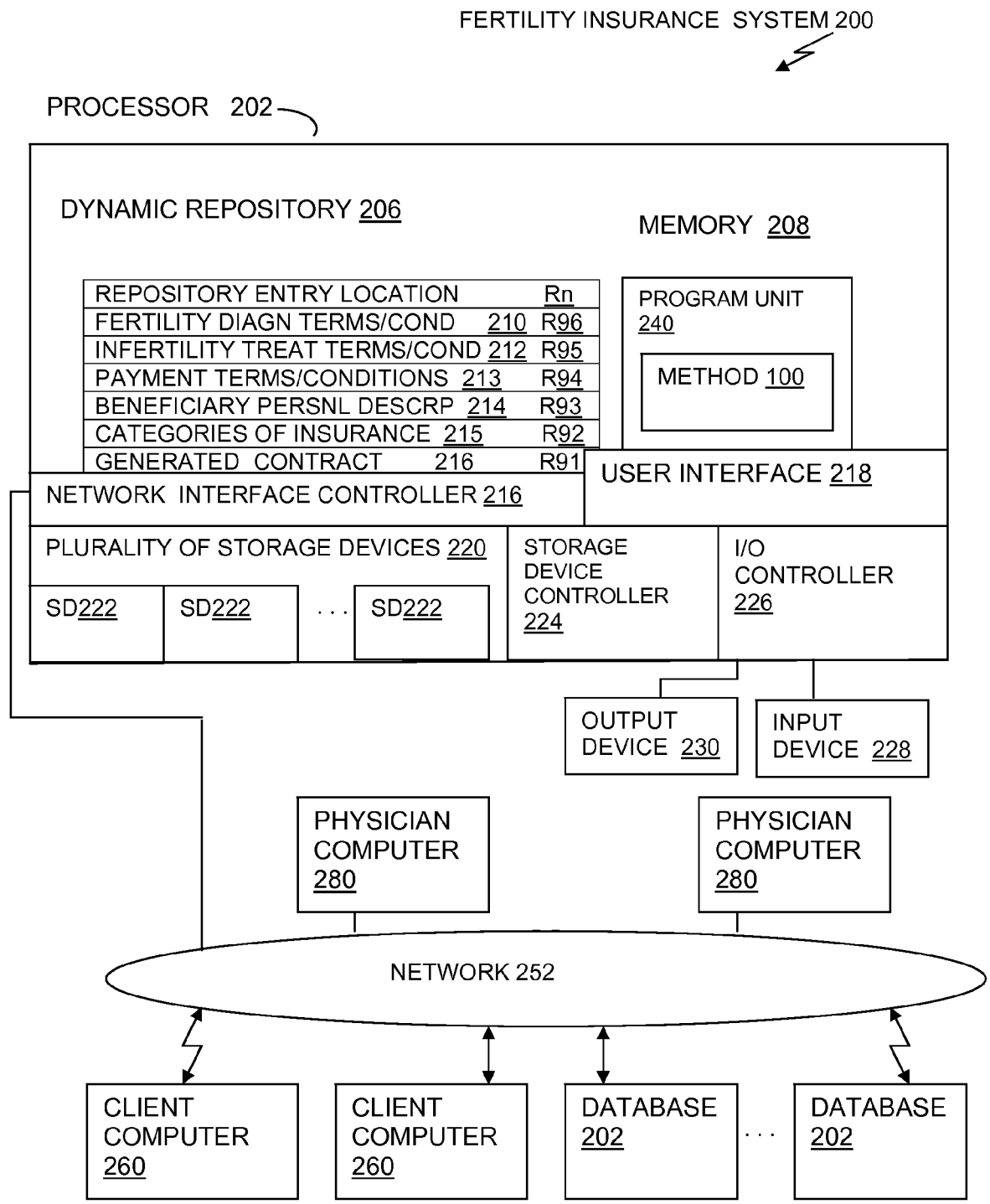
FIG. 2 illustrates a computer implemented system for carrying out the method illustrated in FIG. 1.

An infertility insurance method 100 (hereafter "the method 100") and an infertility insurance system 200 (hereafter "the system 200") are illustrated in FIG. 1 and FIG. 2 respectively.

Referring to FIG. 1, the method 100 describes providing an insurance coverage policy for treatable infertility conditions.

Referring to FIG. 2., the system 200 embodies and implements the various methods, procedures and operations of the method 100 in the structure of computer executable program code, computer executable and computer readable media, and other hardware, firmware and software module, network, application and interface platforms upon which the method 100 is carried out in the technological arts. Thus, the exemplary embodiments will be understood by referring to FIG. 1 and FIG. 2 presented herein.

Referring to FIG. 2, the system 200 includes a computer processor 202 (hereafter "the processor 202"), and either connected to or residing in the processor 202 are a plurality of network interface controllers, input/output controllers, storage devices and input and output devices, such as a network interface controller 216, a user interface 218, an input/output (I/O) controller 226, an output device 230, an input device 228, a plurality of storage devices 220, including storage devices SD222.

The network interface controller 216 communicatively connects the processor to a network 252, where a plurality of client side, server side, and user network devices reside, interact and operate communicatively over the network 252. These devices include a plurality of physician computers systems, such as a physician computer 280, a plurality of client/user computer systems, such as a client computer 260 and a plurality of network database and storage systems such as a database 202. The network 252 can be a wide area network communications network, including an Internet or an extranet or the network 252 can be a local area network, including an intranet.

Referring to FIG. 2, in accordance with exemplary embodiments, the input device 228 can be at least one of a mouse, a keyboard, a touch screen, a joystick, a thumbwheel, a light pen wand, an audio microphone or an electronic, a copier system or machine, a hard copier scanner system or machine, and/or a radio frequency scanning device (RFID).

The processor 202 further includes a memory 208 (hereafter "the memory 208"). Residing in the memory 208 are a program unit 240 (hereafter "the program unit 240") and a dynamic repository 206 (hereafter "the dynamic repository 206"). Residing in the dynamic repository 206 are a plurality of repository entry locations R91, R92, R93, R94, R95, R96 through Rn, where Rn theoretically represents an infinite number of repository entry locations limited only by known physical memory capacity, can additionally be extended virtually. Thus, each repository entry location R91 up to Rn can hold and/or store a plurality of information and/or data including fertility diagnosis terms and conditions 210 in R6, infertility treatment terms and conditions 212 in R5, payment terms and conditions 213 in R4, beneficiary personal descriptor information 214 in R3, categories of insurance 215 in R2 and generated contract information 216 in R1. These groups of information and data can be easily and programmatically accessed and exercised to provide various solutions to insurance related problems in regard to the provision of insurance coverage policies for treatable infertility conditions.

Further residing in the program unit 240 is a plurality of computer readable and computer executable media that contain a plurality of computer programs, algorithms and software applications, including operations and procedures of the method 100 encoded as computer readable and computer executable program code in the form of a program product.

In exemplary embodiments, the system 200, a method 100 illustrated in FIG. 2 and FIG. 1 respectively can be implemented in software, firmware or hardware or a combination of each. According to exemplary embodiments, the method 100 is implemented in software, as executable program code, which comprises an ordered listing of executable instructions for implementing logical functions, and which is executed by a custom made special or off-the-shelf general purpose digital computers including a PDA, a personal computer, a workstation, a minicomputer or a mainframe computer.

In exemplary embodiments, the system 200 is implemented in a general purpose digital computer designated as a processor, such as the processor 202. The processor 202 is a hardware device for executing software including software stored in the memory 208 and in the program unit 240, including a program encoded as the method 100. The processor 202 can be any custom made or commercially available, off-the-shelf processor, a central processing unit (CPU), one or more auxiliary processors, a semiconductor based microprocessor, in the form of a microchip or chip set, a macroprocesssor or generally any device for executing software instructions. The memory 208 and the dynamic repository 206 and the plurality of storage devices 220, SD222 and the plurality of databases such as database 202 can include any one of or a combination of volatile memory elements, including random access memory (including RAM, DRAM, SRAM and/or SDRAM) and non-volatile memory elements including read only memory (including ROM, erasable programmable read only memory, electronically erasable programmable read only memory EEPROM, programmable read only memory PROM, and/or compact disc read only memory CD-ROM or FLASH memory) magnetic tape, disk, diskette, cartridge, cassette and/or optical memory. The memory 208 can have an architecture where various components are situated remotely from one another, but can be accessed by the processor 202.

Figure 3:
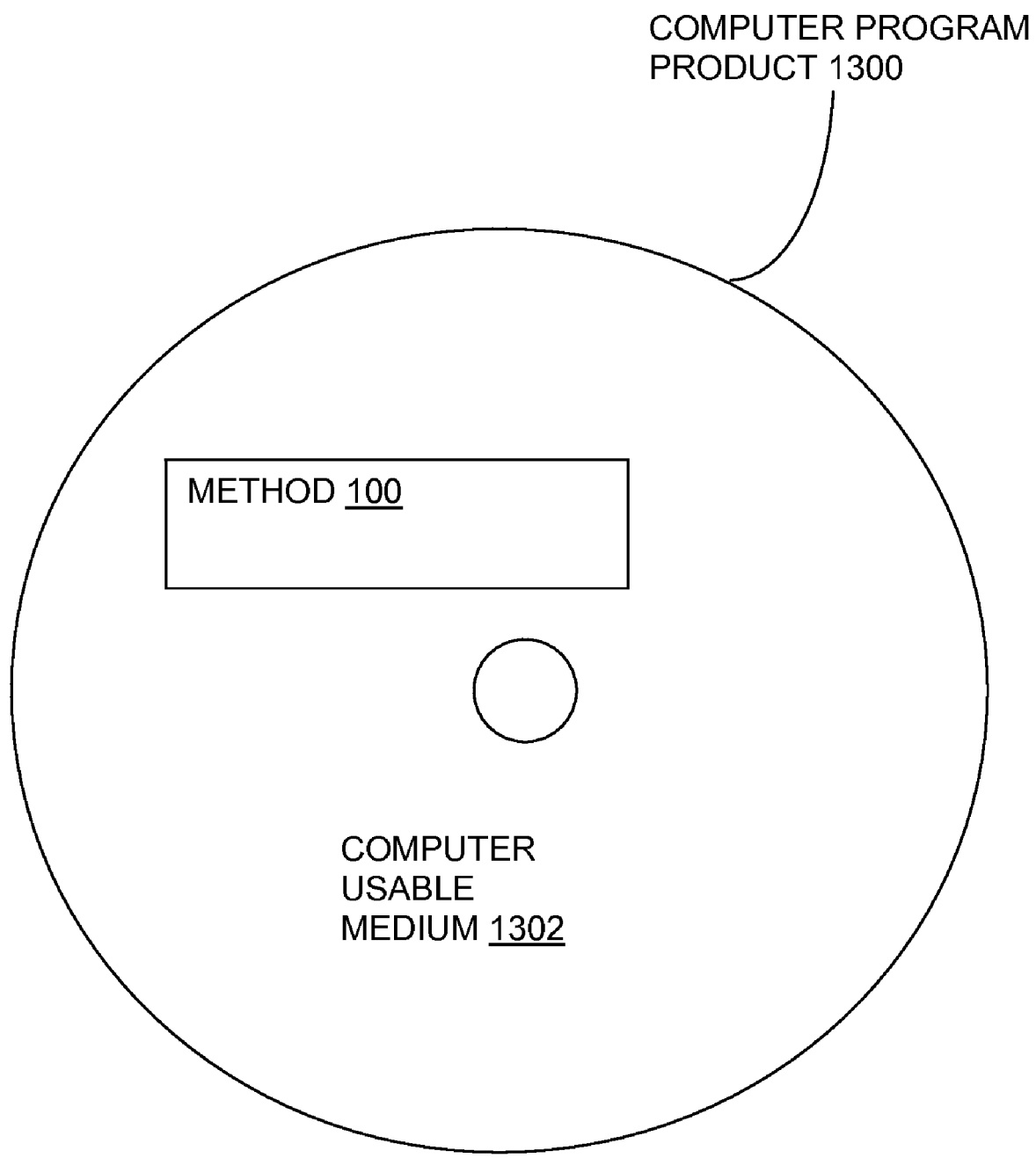
FIG. 3 illustrates a computer program product.

Referring to FIG. 1, FIG. 2 and FIG. 3, in accordance with exemplary embodiments, residing in the program unit 240 is a plurality of computer readable and computer executable media (such as the computer usable medium 1302) which contain a plurality of computer programs, or algorithms and/or software applications, composing operations, instructions and/or procedures of the method 100 encoded as computer readable and computer executable program code, contained in the computer program product 1300. In exemplary embodiments, software in the program unit 240 includes a suitable operating system.

The system 200 when implemented in hardware can include discrete logic circuits having logic gates for implementing logic functions upon data signals, or the system 200 can include an application specific integrated circuit (ASIC).

Referring to FIG. 1 and FIG. 2, in a first exemplary embodiment, at an operation start 102 (hereafter "the operation 102"), the system 200 receives a signal from an operator or an individual user from the input device 228 or an automatic wake up signal from the processor 202 which activates and initiates the computer executable program code of the method 100. And, the method 100, upon activation, performs other operations from selection signals received in the processor from the input device 228, causing the method 100 to be executed by the processor 202 to perform operations and procedures including calling algorithms and applications executed to perform operations and sub operations of the method 100 of providing one or more insurance coverage policies for treatable infertility conditions to a plurality of beneficiaries and/or agents and/or promissors of the beneficiaries. Thus, the processor 202 receives automatically and electronically over the communications network or an agent of the insurance provider receives manually, orally, and/or in person a signal requesting initiation of the program code to register one or more individuals from a plurality of individuals as either a beneficiary or as two or more beneficiaries for the insurance coverage policy for treatable infertility conditions. And, in an initiating operation, the program code directs the processor 202 to initiate a program to register the one or more individuals as beneficiaries (also referred to as prospective beneficiaries and applicant beneficiaries) from the plurality of individuals for the insurance coverage policy for treatable infertility conditions.

Referring to FIG. 1 and FIG. 2, in the first exemplary embodiment, at a providing submission format operation 103 (hereafter "the operation 103") in response to the signal requesting initiation of the program code to register one or more individuals from a plurality of individuals as either a beneficiary or as two or more beneficiaries for the insurance coverage policy for treatable infertility conditions, in the operation 102, the program code of the method 100 executed by the processor 202 causes the processor 202 to automatically transmit to the one or more individuals from a plurality of individuals as either a beneficiary or as two or more beneficiaries for the insurance coverage policy for treatable infertility conditions over the network 272 a submission format, for submitting treatment and payment terms and conditions with physicians, as well as terms and conditions and personal information of one or more individuals from a plurality of individuals as either a beneficiary or as two or more beneficiaries for the insurance coverage policy for treatable infertility conditions. The submission format can be implemented in an electronic file transmitted over the Internet or the submission format can be implemented as a computer program product such as the computer program product 1300 containing a program product conforming to and/or compatible with the program code and/or the program product of the method 100 and embedded in a computer usable medium such as a computer usable medium 1302. The submission includes blank electronic spreadsheet templates which accommodate treatment and payment terms and conditions with physicians, as well as terms and conditions and personal information of physicians and of one or more individuals from a plurality of individuals as either a beneficiary or as two or more beneficiaries for the insurance coverage policy for treatable infertility conditions. The blank electronic spreadsheet templates can be in EXCEL spreadsheet format or any other commercial off the shelf spreadsheet software program application(s) or noncommercial custom made and/or special spreadsheet software program application. The commercial spreadsheet formats include, but are not limited to EXCEL, LOTUS, or LOTUS 123, or WORDPERFECT QUATTRO PRO, or CALC. The electronic spreadsheet format contains column and/or row headings, which indicate types of date to be entered in various spreadsheet cells. Further, the submission format spreadsheet template includes instructions in a word processing format, such as MSWORD. These instructions provide a roadmap as to what data/information is required and how the submission format is to be filled out. This submission format can also be transmitted and/or received electronically or via a hard copy paper version by manual delivery means. With the required submissions from doctors, physicians and/or representatives of their offices and/or information from the one or more individuals from a plurality of individuals as either a beneficiary or as two or more beneficiaries for the insurance coverage policy for treatable infertility conditions, the user operator and/or contract specialist utilizing the system and receiving data can utilize numerical algebraic formulas or the information and data is input manually or electronically by electronic retrieval from the spreadsheet format by the processor 202, so that the processor 202 executing the method 100 can pre-negotiate treatment and payment terms and conditions with physicians and register beneficiaries and matching beneficiaries with infertility insurance and coordinate providing infertility treatment and payment for services. Any and/or all of the procedures can be conducted manually by an operator as well as automatically by the processor 202.

Referring to FIG. 1 and FIG. 2, in the first exemplary embodiment, at a pre-negotiating operation 104 (hereafter "the operation 104") conducted by the fertility insurance system, i.e., the system 200, infertility treatment and payment terms and conditions are negotiated with a plurality of physicians in communication with the processor over the network 252. Thus, the health care providers and physicians agree with the insurance company in advance to provide fertility diagnoses and infertility treatments at a predetermined scale of pricing to a plurality of beneficiaries of the insurance coverage policy for treatable infertility conditions.

Referring to FIG. 1 and FIG. 2, in the first exemplary embodiment, at a receiving and storing operation 106 (hereafter "the operation 106") conducted by the fertility insurance system, such as the system 200, negotiated infertility treatment and payment terms and conditions are received electronically, (such as in the submission format discussed in operation 103) by the processor 202 over the network 252 or received in hard copy format and input into the processor 202 via one or more input devise such as the input device 228 and stored in the dynamic repository 206 by the processor 202. The program code of the method 100 executed by the computer processor 202 causes the computer processor 202 to automatically paste, to an other sheet or store in the temporary and/or permanent storage repository, such as the dynamic repository 206 or a clipboard, the group of data including the negotiated infertility treatment and payment terms and conditions, as well as personal descriptor data. Payment terms and conditions 213 agreed to by the physicians are stored in the repository entry location R94 of the dynamic repository 206.

Fertility diagnoses terms and conditions 210 are stored in the repository entry location R96 of the dynamic repository 206. Infertility treatment terms and conditions 212 are stored in repository entry location R95 of the dynamic repository 206. Also, categories of insurance 215 are stored in repository entry location R92 of the dynamic repository 206. Categories of insurance 215 can be entered manually or the method 100 can call an algorithm or subroutine to collect related information from other terms and conditions categories and automatically generate categories of insurance and automatically populate the repository entry location R92 with such data.

The processor 202 is directed by the computer executable program code implemented in method 100 to input, into a terms and conditions dynamic repository 206, a plurality of terms and conditions that relate to the insurance coverage policy for treatable infertility conditions. The terms and conditions database is communicatively connected to the processor. These terms and conditions are entered either manually or automatically. When these terms and conditions are input manually the computer executable program code directs the processor to prompt a user of the computer implemented system to enter the terms and conditions, by-way-of one or more input devices communicatively connected to the processor. The plurality of terms and conditions relate to the insurance coverage policy for treatable infertility conditions. Therefore, the processor, directed by the computer executable program code, receives and then inputs into the terms and conditions database one or more of the following terms and conditions:

Examples of the fertility diagnosis terms and conditions 210, examples of infertility treatment terms and conditions 212 and examples of payment terms and conditions 213 input and stored in the operation 106, where the storing operation 106, include: categories of a beneficiary and/or a group of beneficiaries of the insurance coverage policy for treatable infertility conditions; further, the terms and conditions entered and received into the terms and conditions database stipulate that a beneficiary and/or the beneficiaries must be either a living human being and/or a group of living human beings (i.e., a human life and/or a group of human lives in being) at the time the insurance coverage policy for treatable infertility conditions is created and/or executed, and the beneficiary and/or the group of beneficiaries can be either male, or female, or a person of transgender or heterosexual or same sex orientation; further, the terms and conditions entered and received into the terms and conditions database stipulate that the insurance coverage policy for treatable infertility conditions vests when either the beneficiary and/or the group of beneficiaries reaches child bearing age, where child bearing age can be 21-45 years of age. Further, the terms and conditions entered and received into the terms and conditions database stipulate that the insurance coverage policy for treatable infertility conditions is either a term insurance policy type, an annuity insurance policy type, and/or an indemnity insurance policy type or some combination of one or more of the term, annuity and/or indemnity types; the terms and conditions entered into and/or received by the processor further stipulate that the payment terms and conditions for the insurance coverage policy for treatable infertility conditions depends on the age and/or health and a cursory fertility screening of the beneficiary and/or the group of beneficiaries and includes a premium based on either a one-time lump-sum payment, a monthly payment plan, a quarterly payment plan, an annual payment plan, a copayment plan and/or a combination of one or more of the monthly payment plan, the quarterly payment plan, the annual payment plan and the copayment plan; further the terms and conditions entered into and received by the processor stipulate that the insurance coverage policy for treatable infertility conditions can be transferable to either a natural and/or an adopted offspring/issue, sibling, parent, and/or legal guardian of either the beneficiary or the group of beneficiaries; further, the terms and conditions entered and received by the processor stipulate that the payment plan and the responsibility and/or the commitment for payment is transferable to the beneficiary, the group of beneficiaries, a sibling, one or more parents and/or the legal guardian of either the beneficiary and/or the group of beneficiaries. Further, the terms and conditions entered and received by the processor stipulate that when the age of the beneficiary is from one (1) year old up to twelve (12) years old, no physical examination and pre-exam screening are required. When the age of the beneficiary is from thirteen (13) years old up to eighteen years old, no physical examination is needed, although a pre-exam screening and/or fertility cursory exam screening is required and that a pre-exam and a fertility cursory screening are defined as either a session or sessions where the prospective or applicant beneficiary or beneficiaries or their parent or parents or legal guardian are required to answer questions and/or complete a screening questionnaire. The questions can be administered manually, in person or electronically by a representative of the insurance company. Or the questions can be answered online on a computer, where the applicant, the applicant's representative or a representative and/or agent of the insurance company can complete the questionnaire and/or answer the questions online on the computer by entering the answers using one or user input devices communicatively connected to the computer. The questionnaire can be presented to the applicant either manually, in person or electronically by a representative of the insurance company. The questionnaire can be a hard copy paper or an electronic version, i.e., a version fillable electronically. Or, the questioning and the questionnaire can be administered by the processor via one or more output devices communicatively connected to the processor, where the processor through an output device prompts a user to enter data, so that the processor can receive the input data. The one or more output devices can include one or more of or a combination of a printer, a touch screen terminal, a computer CRT, a speaker, and/or lights. When directed by the computer executable program code, the processor prompts a user of the computer implemented system to enter answers to the questions and questionnaire by-way-of one or more of the input devices communicatively connected to the processor. The processor receives the answers of the proposed beneficiary and/or the applicant beneficiary and stores the answers into a beneficiary application database. Also, the processor can search the files of the insurance company and determine if information relevant to the required answers for the fertility screening exam, questions and/or questionnaire and/or application are already available in the beneficiary database, because or previous business dealings with the beneficiary or the beneficiary's family, in regard to other insurance policies and/or records; the processor determines if such information is already available and if such information is available in the insurance company's client database, then the processor retrieves the information relevant to answering the questions and completing the questionnaire automatically. Further, the terms and conditions to be entered into and received by the processor stipulate that when either an individual and/or a group of individuals in the age range from 18 to 25, who are not covered by the insurance coverage policy for treatable infertility conditions, want to become the beneficiary of the insurance coverage policy for treatable infertility conditions, then such individuals in the age range from 18 to 25 may apply for the insurance coverage policy for treatable infertility conditions, after undergoing a physical examination by a health care provider designated by the insurance company. However, the individual or the group of individuals in the age range from 18 to 25, who are not currently beneficiaries of the insurance coverage policy for treatable infertility conditions, and who want to become beneficiaries of such a policy, must agree to pay an increased amount for an insurance premium for such policy, further, the terms and conditions entered and received in the processor, for individuals 18 to 25 years of age, in regard to applying for such a fertility policy, stipulate that the policy will only vest and services can only commence and be provided, when such applicant beneficiaries, who are between 18 to 25 at the time of the application, attain an age between the range of 25 to 45 years old.

Additional terms and conditions stored in the dynamic repository 206 include: where treatment plans for infertility treatments include one or more fertility treatments in the art of assisted reproductive technology (ART) relating to infertility conditions including: intrauterine insemination, in vitro fertilization (IVF), assisted hatching, pre-genetic diagnosis (PGD), intracytoplasmic sperm injection (ICSI), surrogacy, egg donation, sperm donation, controlled ovulation induction cycles and medications. Fecundability (f) is defined as the probability of conceiving during any one menstrual cycle, wherein (over a short period of time) the probability of failing to conceive during any one menstrual cycle is 1−f, and for a large sample size of couples seeking to conceive, the probability for conception is f, for the first month; fx(1−f) for the second month; fx(1−f)$^2$ for the third month and fx(1−f)$^{N-1}$ for the Nth month; and the summation probability of conception (F) through month N (according to Robert Barbieri, Yen and Jaffe's Reproductive endocrinology, 2004) can be calculated as:

$$\Sigma f + fx(1-f) + fx(1-f)^2 + fx(1-f)^{N-1} = F = 1-(1-f)^N \qquad (1).$$

Premium costs are based on actuarial tables and models and dependent on the age of the beneficiary or beneficiaries at the time of purchase of the policy. These cost determinants can be used independently of each other or combined together.

Referring to FIG. 1 and FIG. 2, in the first exemplary embodiment, at a contracting with physicians operation 108 (hereafter "the operation 108") conducted by the fertility insurance system, i.e., the system 200, contracts are generated and executed by the fertility insurance system 200 and executed bilaterally with the plurality of physicians forming a network of physicians for performing infertility treatments to patient beneficiaries of the insurance coverage policy for treatable infertility conditions, wherein contracting is performed by either the processor 202 or by an automated wizard program, operating on the processor 202, as part of the computer executable program code executing in the processor 202, or an agent of the insurance company using the processor 202.

The processor 202 directed by the computer executable program code, embodying the method 100, contracts over the network 252, online and in real time with the plurality of health care providers, for plans and optional plans of coverage for payment terms and conditions and treatment terms and conditions for infertility treatments to be provided to the plurality of beneficiaries of a plurality of insurance coverage policies for fertility diagnoses and treatable infertility conditions, by the plurality of health care providers.

Referring to FIG. 1 and FIG. 2, in the first exemplary embodiment, at a registering beneficiary operation 110 (hereafter "the operation 110") conducted by the fertility insurance system, such as the system 200, a plurality of individuals seeking to participate in the insurance coverage policy for treatable infertility conditions, are sent marketing information and questionnaires and applications requesting personal descriptor data to be completed online or manually and returned to the insurance company processor 202, for registration as beneficiaries by the fertility insurance system.

The program code, implementing the method 100, when executed by the processor 202, causes the processor 202 to register, in real time, one or more individuals as a beneficiary and/or beneficiaries for the insurance coverage policy for treatable infertility conditions. The registering operation includes either receiving electronically through one or more, input devices, such as the input device 228, connected to the processor 202 or verbally by-way-of audible communications understandable by a human user or receiving in a hardcopy transcribed medium (including paper) an application for insurance for the insurance coverage policy for treatable infertility condition. The application contains a plurality of personal descriptor information about the one or more individual prospective beneficiaries from either a first alternate user in communication (by-way-of one or more input devices) with the processor over the communications network. The first alternate user is either a parent, or a guardian, or a spouse, or a sibling, or a representative, or an agent of the prospective beneficiary and/or beneficiaries, or a person holding power of attorney for the at least one individual from the plurality of individuals or an agent of an insurance organization writing the insurance coverage policy for treatable infertility conditions.

Referring to FIG. 1 and FIG. 2, in the first exemplary embodiment, at a storing personal descriptor data operation 112 (hereafter "the operation 112") conducted by the fertility insurance system, such as the system 200, personal descriptor data from the completed applications and questionnaires are stored in the dynamic repository 206 of the processor 202 for subsequent use by the program implementing the method 100 running on the processor 202.

The processor 202 is directed by the computer executable program code implementing the method 100 to input into repository entry location R93 of the dynamic repository 206, which is communicatively coupled to the processor 202, either automatically or by prompting a user to manually key in the beneficiary personal descriptor information 214 and/or data into the dynamic repository 206. The plurality of beneficiary personal descriptor information 214 and/or data includes information about the one or more individuals (such as prospective beneficiaries) from the plurality of individuals received during the registering operation i.e., the operation 110, where one or more individuals from the plurality of individuals who are prospective beneficiaries were registered by the processor 202 for the insurance coverage policy for treatable infertility conditions. The plurality of the beneficiary personal descriptor information 214, about the one or more individuals from the plurality of individuals who are prospective beneficiaries of the fertility insurance coverage, includes, but is not limited to, at least two or more of the following information: full name of the at least one individual, age of the at least one individual, sex and/or gender of the at least one individual, health status of the at least one individual, social security number, address, phone number, mother's name, father's name, spouses' name, and guardian's name.

Referring to FIG. 1 and FIG. 2, in the exemplary embodiment, at a first determining operation, such as a knowledge base system matching operation 114 (hereafter "the operation 114") conducted by the fertility insurance system, such as, the system 200, a knowledge base system software application running on the fertility insurance system is used to generate a plurality of categories of fertility insurance coverage, including categories of insurance 215 for the plurality of beneficiaries and determine whether matching exists between the plurality of categories of fertility insurance coverage and beneficiary personal descriptor information 214 data of individuals seeking to participate in the fertility insurance coverage. The categories of fertility insurance are automatically learned, generated and stored in the dynamic repository 206 repository entry location R92 by the knowledge base system, based on retrieval and analysis of the treatment and payment terms and conditions 210 and 212, and the beneficiary personal descriptor 214 data of individuals seeking to participate in the fertility insurance coverage, already stored in the dynamic repository 206, and when matching of categories of fertility insurance 215 and beneficiary personal descriptor 214 data is determined not to exist, the computer executable program code implementing the method 100 causes the processor 202 to continue registering the plurality of beneficiaries, such as continuing the operation 110 and continuing the operation 112 and storing additional personal descriptor data in the dynamic repository 206.

According to the first exemplary embodiment, the operation 114 includes determining whether matching exists between the plurality of categories of fertility insurance coverage and beneficiary personal descriptor information 214 data of individuals and/or couples seeking to participate in the fertility insurance coverage is accomplished by calling and executing one or more algorithms and/or programs to determine fecundability and/or the probability of failing to conceive during any one menstrual cycle, which can be calculated for one or both partners forming a couple as:

$$\Sigma f + fx(1-f) + fx(1-f)^2 + fx(1-f)^{N-1} = F = 1-(1-f)^N \quad (1)$$

Referring to FIG. 1 and FIG. 2, in the exemplary embodiment, at a second determining operation, such as a negotiating treatment and payment operation 116 (hereafter "the operation 116") conducted by the fertility insurance system, such as the system 200, acceptable infertility treatment and payment terms and conditions are negotiated with either the plurality of beneficiaries or an agent or a promissory of any one of the plurality of beneficiaries, when matching of categories of fertility insurance and personal descriptor data is determined to exist. Information and data pertaining to these acceptably negotiated infertility treatment and payment terms and conditions are of either the plurality of beneficiaries or an agent or a promissory of any one of the plurality of beneficiaries are received by the processor 202 and stored in a manner similar to the operation 106 discussed above. When negotiating beneficiary treatment and payment terms and conditions are not successful, the computer executable program code causes the processor to further determine whether matching of categories of fertility insurance, i.e., operation 114 and personal descriptors exists and further registering beneficiaries, as in performing operation 110, and storing personal descriptor, operation 112, data and further negotiating beneficiary treatment and payment terms.

The processor 202 directed by the executable program code implementing the method 100, negotiates terms and conditions of the insurance coverage policy for treatable infertility conditions with one of the beneficiary, the parent, the guardian, the spouse, the representative, the agent of, and the person holding power of attorney for the beneficiary of the insurance coverage policy for treatable infertility conditions; automatically matching, using artificial intelligence (AI) languages/programs and/or knowledge base systems and/or expert systems and/or any combination of AI, knowledge base systems and expert systems, including fuzzy matching in a dynamic repository 206, the personal descriptors of an applicant beneficiary with the terms and payment terms and conditions and the treatment plan terms and conditions to generate a contract between an insurance provider and the applicant beneficiary. The artificial intelligence systems include rule based systems, chaining, pruning, dependencies, model based reasoning systems, neural models, neural fuzzy models, statistical estimators, neural nets, neural networks as a statistical estimator, to determine dependencies and current activity parameters, fuzzy logic, decision trees, statistical estimators and statistical estimators trained with training data.

Referring to FIG. 1 and FIG. 2, in the first exemplary embodiment, at an accepting bilaterally the contract operation 118 (hereafter "the operation 118") conducted by the fertility insurance system, such as the system 200, when negotiations are completed and terms and conditions are acceptable to the insurance company and the beneficiary and/or the agent of the beneficiary, the insurance company and the beneficiary and/or agent of the beneficiary bilaterally accept and execute a contract for the fertility insurance policy. The insurance company accepts ratification of the contract by the beneficiary, when the policy vests.

The processor 202 directed by the computer executable program code, implementing the method 100, ratifies a contract between the insurance provider and either the applicant beneficiary, the parent, the guardian, the spouse, the representative, the agent of the beneficiary, and the person holding power of attorney for the beneficiary of the insurance coverage policy for treatable infertility conditions, where the contract is drafted by the insurance provider, and wherein the applicant beneficiary becomes the beneficiary, once the contract is approved and signed by the proposed beneficiary and a representative/agent of the insurance company.

Referring to FIG. 1 and FIG. 2, in the first exemplary embodiment, at a coordinating operation 120 (hereafter "the operation 120") conducted by the fertility insurance system, such as the system 200, the processor 202 directed by the computer executable program code implementing the method 100, coordinates providing infertility treatment to the plurality of beneficiaries by any one or more of the plurality of physicians in the network of infertility treatment providers, by generating a signed contract for the insurance coverage policy for infertility treatment conditions and sending the signed contract electronically and by hardcopy paper to one of the beneficiary, the agent of the beneficiary and the agent of the beneficiary and one or more physicians providing infertility treatment and by storing the contract for later usage, where coordinating is performed by either the processor 202 or the automated wizard program, operating on the processor 202 as part of the computer executable program code executing the method 100 in the processor 202, or the agent of the insurance company using the processor 202. Further, coordinating includes collecting payment from the beneficiary or the agent and/or promissory of the beneficiary, and/or coordinating payment to the fertility care providers, and where the beneficiary can be a third party beneficiary, such as an infant who will not receive the benefit of the fertility insurance policy until he or she reaches the age of majority and ratifies the contract for fertility insurance.

The processor 202 directed by the computer executable program code implementing the method 100, coordinates, automatically, provision of fertility diagnostic and infertility treatment services by one or more health care providers of the plurality of health care providers who pre-negotiated with the insurance company to provide fertility diagnostic and infertility treatment and services to the beneficiary and/or the beneficiaries, when the beneficiary and/or the beneficiaries is/are eligible, wherein coordinating further includes providing a globally accessible contact list of the plurality of providers of diagnosis and infertility treatment services over the computer implemented communications network, such as the network 252; and the processor 202 coordinates payment to one or more of the health care providers providing infertility treatments within the treatment plan.

The insurance company receives payment from the insurance provider by one of the beneficiary, the parent, the guardian, the spouse, the representative, the agent of the beneficiary, and/or the person holding power of attorney for the beneficiary of the insurance coverage policy for treatable infertility and/or fertility diagnosis conditions and the processor directed by the computer executable program code acknowledges and/or memorializes receipt of payment by the beneficiary or beneficiaries or the representative(s) and/or agent(s), guardian, and parent or parents of the beneficiary; receiving payment by the insurance provider by one of the beneficiary, the parent, the guardian, the spouse, the representative, the agent of, and the person holding power of attorney for the beneficiary of the insurance coverage policy for treatable infertility and/or fertility diagnosis conditions and generates a receipt for payment to the beneficiary and/or his/her representative and/or representatives.

There are other cutting edge scientific and medical treatments that require comprehensive insurance underwriting, and which are not now covered and/or not now adequately covered. Science and Medicine have continued to advance, however many procedures available are considered elective medical and dental procedures. In addition to infertility treatment services, cord blood stem cell banking would be affordable for everyone's future benefit as breakthrough uses occur. Everyone would be prepared for the unknown in life, potentially solving over 70 diseases and giving and/or saving many lives. Thus, comprehensive, insurance coverage packages covering cutting edge cord blood stem cell banking will give people the opportunity to afford dental work such as crowns, veneers, implants, orthodontics and more over time. Many may need or desire cosmetic surgery such as liposuction, hair restoration, tummy tucks and more. For the morbidly obese, bariatric surgery may be needed in order to help individuals lose weight. Obesity represents a major public health issue in the United States. Obesity affects over 60 million Americans. Obesity has continued to increase since 1960. Obesity related comorbidities such has hypertension, dyslipidemia, type 2 diabetes mellitus, coronary artery disease, stroke, gallbladder disease, osteoarthritis, sleep apnea, and certain cancers represent the second leading cause of death in the United States. In many cases, the patient's only hope is surgery. In 2004, in the United States over 100,000 bariatric surgical procedures were performed. In most cases insurance companies do provide financial services but only if one is considered to be morbidly obese.

The exemplary embodiments provide disciplined means for setting aside money at an early age to address future issues of infertility at the reproductive age. Exemplary embodiments target newly-born babies and toddlers five years old or younger. This is the most important segment of clientele in our business model. Parents and grandparents will be educated and counseled on all aspects of infertility, the increasingly prohibitive cost of treatment and the limited resources and options available for future treatment benefits. They will be offered different benefit-plans at a sliding scale cost depending at the treatment plan and the child's age. Parents/grandparents will make very low payments or a one-time payment and benefits will be available when the child reaches reproductive age which is defined by the policy as 21 years old. Additionally, exemplary embodiments provide means for money to be invested for a very long time before any benefits are required or delivered. This is in contrast to a regular insurance scheme where benefits may be required and delivered immediately after the policy is purchased in case of a car accident (car insurance policy), death (life insurance policy) or sickness (medical insurance policy). Exemplary embodiments provide means in which a policy is purchased for a newborn or a toddler where prior to the development of these embodiments benefits could not be legally delivered before their 18$^{th}$ birthday.

Furthermore, exemplary embodiments also target a select group of clientele younger than five years of age, as well as older than five years of age. Children 6-18 years of age will receive the same benefits at a sliding scale to account for the age at which their policies are purchased.

Features of the exemplary embodiments can be marketed to parents and grandparents of new borns, toddlers, young children and teenagers. Parents, particularly pregnant mothers will be targeted through brochures at obstetrics and gynecologists clinics, Lamaze classes and hospitals at and after child birth. Parents of young children will be targeted through brochures at pediatrics clinics and family practitioners.

Exemplary embodiments are directed to the adult population that suffers from infertility as significantly more inclined to be interested in purchasing infertility benefits for their children. These are adults that experienced the hardship, pain and financial stress associated with infertility. These prospective parents also recognize that they are more likely to parent children who may likely suffer infertility issues, especially if their children were conceived through advanced reproductive technologies such as IVF and ICSI, because the offspring of these infertility patients will most probably inherit the same genes that contributed to their parent's infertility. Thus, exemplary embodiments target this group of potential clientele through obstetrics and gynecology clinics and infertility and IVF clinics. Exemplary embodiments use fertility data of all infertility patients that undergo successful IVF with a live birth in the United States to target delivery of services. Datasets of information used in the exemplary embodiments are accumulated and stored by the Society for Assisted Reproductive Technologies (SART); however, none of the information accumulated by SART will be disclosed publically, because of medical privacy and HIPPA regulations. Additional exemplary embodiments provides means for SART to be reimbursed for literature mailing costs to potential clients and thus SART will be responsible for discretely distributing such literature in a way that maintains the privacy of health information and satisfies HIPPA rules and regulations.

Additionally, exemplary embodiments will be adaptable to federal government universal coverage models of benefits and services for infertility coverage by allocation of a minimal amount of monetary investment in purchasing infertility insurance at the time of birth of each child to be invested long term to cover all future infertility benefits for that child during his/her reproductive years.

Benefits: Infertility insurance coverage, based on exemplary embodiments, for a variety of services tailored to different infertility needs and requirements, include:

TABLE 7

Clomid + timed intercourse
Gonadotropins + timed intercourse
Intrauterine insemination
Clomid + intrauterine insemination
Gonadotropins + intrauterine insemination
Intrauterine insemination +
Sperm donation services
IVF
ICSI
Assisted hatching
Preimplantation genetic screening
IVF - egg donation
Surrogate carrier
Cryopreservation of sperm
Cryopreservation of eggs
Cryopreservation of embryos
Storage of sperm
Storage of eggs
Storage of embryos
Frozen/thawed embryo transfer Timed intercourse is the most basic and least expensive treatment for infertility. If a basic work-up determines that the fallopian tubes are open, the ovaries are producing normal follicles, the lining of the uterus is developing adequately, and the partner's semen is normal, the first course of treatment may be to attempt pregnancy through timed intercourse. This procedure involves regular visits and ultrasounds to predict the time of ovulation and determine when the partners will be advised to have intercourse. Timing of intercourse in this way helps to insure that sperm will be in the fallopian tube at the time the egg is released and begins to travel down to the uterus.

Sexual intercourse is recommended at least every other day just before and after ovulation. During ovulation, a mature egg is released and settles into one of your fallopian tubes. This egg will survive for only about 24 hours after ovulation. A man's sperm, however, can survive for 48-72 hours in a woman's reproductive tract.

Assuming that a woman has a 28-day cycle and that ovulation occurs around the 14th day of her cycle that means that her most fertile times occur during days 11 to 17 of her cycle. However, not all women have 28-day cycles. The key to timing intercourse is to know the length of the menstrual cycle so you can estimate when ovulation occurs. It's also important to understand that this "fertile window" can be highly unpredictable, even if a woman's menstrual cycle is usually regular. Therefore, pinpointing the precise day when ovulation should occur is a bit of a challenge. The easiest, but least precise, way to predict this is to chart the menstrual cycle on a calendar. Remember, a woman's cycle begins on the first day of her period and typically lasts about 28 days. The first day begins not when a woman is spotting, but when she experiences regular flow.

Once a determination is made as to how many days a woman's cycle generally is, subtract 14 days from the predicted end of the cycle to determine time of ovulation. Another option for predicting ovulation may be to use a basal body temperature (BBT) chart. To measure BBT, a woman simply takes her temperature every morning when she wakes up and charts it on a calendar. Her BBT should rise about a half degree two days after a surge in her luteinizing hormone (LH) occurs, indicating that ovulation has happened. Physical release of the ovum (egg) probably occurs on the day prior to the first temperature elevation. Also ovulation predictor kits are available without a prescription at local drug stores. They are simple to use, and can usually predict ovulation 24 to 36 hours in advance. The kit works by measuring increases in a woman's LH level just prior to ovulation.

A more advanced and slightly more expensive form of timed intercourse includes the use of ultrasound to monitor the development of the follicle/egg and the lining of the uterus. Additionally, a "trigger shot" of Human Chorionic Gonadotropin (hCG, or, Profasi) may be given to induce ovulation and assist in the timing of intercourse.

Clomid+timed intercourse: Clomid (clomiphene citrate) is an orally administered, nonsteroidal, ovulatory stimulant. It has the molecular formula of $C_{26}H_{28}ClNO.C_6H_8O_7$ and a molecular weight of 598.09.

Each Clomid tablet contains 50 mg clomiphene citrate USP. Clomid may be offered as a first intervention to ovulating women with unexplained fertility. However, impediments to achieving pregnancy must be excluded or adequately treated before beginning Clomid therapy. Those patients most likely to achieve success with clomiphene therapy include patients with polycystic ovary syndrome, amenorrhea-galactorrhea syndrome, psychogenic amenorrhea, post-oral-contraceptive amenorrhea, and certain cases of secondary amenorrhea of undetermined etiology.

Properly timed intercourse in relationship to ovulation is important. A basal body temperature graph or other appropriate tests may help the patient and her physician determine if ovulation occurred. Once ovulation has been established, each course of Clomid should be started on the $3^{rd}$ to the $5^{th}$ day of the cycle. Long-term cyclic therapy is not recommended beyond a total of about six cycles (including three ovulatory cycles).

Clomid acts by inhibiting the action of estrogen on the gonadotrope cells in the anterior pituitary gland. Since the estrogen receptors are prevented from recycling, the body perceives estrogen levels to be falsely lower than they actually are. As a result of low estrogen levels the body releases more gonadotropin-releasing hormone from the hypothalamus which causes the pituitary gland to produce more hormones to raise estrogen levels. The pituitary gland responds by producing more FSH and LH hormones which stimulate follicular growth leading to a higher rate of ovulation and hence pregnancy. By strengthening the weak egg producing processes, the ovaries produce more eggs. This greatly increases the chance of becoming pregnant. Clomid can lead to multiple ovulations and hence increasing the chance of twins (3-5% of births instead of normal ~1%).

Clomid treatment is usually preceded by tests to determine what is causing infertility. The male partner should also be tested for infertility. If it is determined that the problem is in the ovaries, Clomid is the first treatment usually given. Clomid is administered on Day 3 of the menstrual cycle for five days. The couple will then be advised to start having sexual intercourse 3 times per week. Clomid can be used in conjunction with follicular tracking to monitor the number of follicles as well as advising timed intercourse around ovulation.

Clomid is indicated only in patients with demonstrated ovulatory dysfunction who meet the conditions described below:

1. Patients who are not pregnant.
2. Patients without ovarian cysts. Clomid should not be used in patients with ovarian enlargement except those with polycystic ovary syndrome. Pelvic examination is necessary prior to the first and each subsequent course of Clomid treatment.
3. Patients without abnormal vaginal bleeding. If abnormal vaginal bleeding is present, the patient should be carefully evaluated to ensure that neoplastic lesions are not present.
4. Patients with normal liver function.
5. Patients without sever male factor. In addition, patients selected for Clomid therapy should be evaluated in regard to the following:
6. Estrogen Levels. Patients should have adequate levels of endogenous estrogen (as estimated from vaginal smears, endometrial biopsy, assay of urinary estrogen, or from bleeding in response to progesterone). Reduced estrogen levels, while less favorable, do not preclude successful therapy.
7. Primary Pituitary or Ovarian Failure. Clomid therapy cannot be expected to substitute for specific treatment of other causes of ovulatory failure.
8. Endometriosis and Endometrial Carcinoma. The incidence of endometriosis and endometrial carcinoma increases with age as does the incidence of ovulatory disorders. Endometrial biopsy should always be performed prior to Clomid therapy in this population.
9. Other Impediments to Pregnancy. Impediments to pregnancy can include thyroid disorders, adrenal disorders, hyperprolactinemia, and male factor infertility.
10. Uterine Fibroids. Caution should be exercised when using Clomid in patients with uterine fibroids due to the potential for further enlargement of the fibroids.

Clomid is usually effective within three to six months and if pregnancy is not achieved, another method of treatment is usually indicated.

Intrauterine insemination is the process by which semen is 'washed' to remove seminal plasma, dead sperm, debris, aggregated somatic cells and other amorphous materials and the resulting 'enriched' sperm suspension is placed into the reproductive tract of a female for the purpose of impregnating the female by using means other than sexual intercourse. Both, freshly ejaculated sperm, or sperm which has been frozen and thawed could be used equally well for IUI.

IUI is used as assisted reproductive technology primarily to treat infertility but is increasingly being used to enable women without a male partner (i.e. single women and lesbians) to become pregnant and to produce children by using sperm provided by a sperm donor Intrauterine Insemination Using Partner Sperm Male factor problems form a significant part of infertility (up to 47%). Some couples may be helped by insemination, into the uterus, of sperm collected from the partner. IUI is most commonly used for infertility associated with endometriosis, unexplained infertility, anovulatory infertility, mild degrees of male factor infertility, cervical infertility and for some couples with immunological abnormalities. However, the most common use (by far) for IUI is for unexplained infertility. IUI is not an effective treatment in women older than 40 and in cases of tubal blockage, severe tubal damage, very poor egg quantity and quality, ovarian failure (menopause), and severe male factor infertility.

IUI is a reasonable initial treatment that should be utilized for a maximum of about 3-6 months in women who are ovulating (releasing eggs) on their own. IUI can be reasonable to use it for somewhat longer than this in women with polycystic ovaries (PCOS) and lack of ovulation that has been stimulated with drugs to ovulate. IUI should not be used in women with blocked fallopian tubes. Tubal patency should be demonstrated prior to performing IUI. This is usually done with an x-ray study called a hysterosalpingogram. Most pregnancies resulting from insemination using the male partner's sperm occur in the first 3 attempts. The chances for success per month drop off after about 3 attempts and drop considerably after 4-6 unsuccessful attempts.

Intrauterine Insemination Using Donor Sperm: If the count, motility and/or morphology scores of the partner's sperm are moderately to severely reduced, intrauterine insemination is quite unlikely to be successful. If the woman's partner produces too few motile sperm or no sperm at all, if he carries a genetic disorder, or if the woman has no male partner, the use of donor sperm is indicated. Donor sperm may be provided by a known (directed) or anonymous sperm donor.

If sperm is provided by an anonymous sperm donor through a sperm bank, it will be frozen and quarantined for a particular period and the donor will be tested before and after production of the sample to ensure that he does not carry a transmissible disease. Sperm samples donated in this way are produced through masturbation by the sperm donor at the sperm bank. A chemical known as a cryoprotectant is added to the sperm to aid the freezing and thawing process. Further chemicals may be added which separate the most active sperm in the sample as well as extending or diluting the sample so that vials for a number of inseminations are produced.

Insemination for male factor infertility: Studies have shown that intrauterine insemination can be effective for some cases associated with poor sperm quality. However, if the total motile sperm count at the time of insemination is less than 5 million, the chances for pregnancy are quite a bit lower than with higher counts and if the total motile sperm count is below 1 million, success rates are very low. Therefore, in vitro fertilization or donor sperm insemination is usually performed for these cases. However, sperm counts are not perfect predictors of fertilizing potential. Rare pregnancies can occur even with total motile counts of less than one million. The converse is also true—some "normal sperm" (by semen analysis) can not fertilize eggs at all. The biochemical defect at the molecular level is sometimes not apparent when sperm is evaluated microscopically.

Clomid or Gonadotropin Stimulation+intrauterine insemination: According to many published studies, intrauterine insemination with partner's sperm in conjunction with clomid stimulation or gonadotropins ovarian stimulation.

Insemination combined with ovarian stimulation with injectable gonadotropins provides better pregnancy rates (and higher multiple pregnancy rates) as compared to insemination combined with Clomid pills. Injectable gonadotropins usually stimulate more mature eggs to develop than does clomiphene. More mature follicles and eggs leads to more chance for a pregnancy. Studies have compared the effectiveness of these two therapies for unexplained infertility. Pregnancy rates are improved substantially with either method of therapy as compared to a no treatment natural menstrual cycle (without stimulation).

In vitro fertilization (IVF) is a process by which oocytes (eggs) are fertilized by sperm in vitro or outside the womb. IVF requires healthy ova (eggs), sperm that can fertilize those eggs and a uterus that can maintain the pregnancy. Eggs are removed from the woman's ovaries, they are fertilized with sperm in a laboratory procedure, and then the fertilized eggs (embryos) are returned to the woman's uterus. Each of the requirements of IVF; eggs, sperm and a uterus can be provided by a third person, hence the term third party reproduction in which donor sperm, donor eggs and surrogate carriers. To achieve a pregnancy any of these three requirements can be provided by a third party.

Initially IVF was developed to overcome infertility due to problems of the fallopian tube, but it turned out that it is successful in many other infertility situations as well. Recently, with the introduction of intracytoplasmic sperm injection (ICSI) to treat severe male infertility, assisted hatching, blastocyst culture, preimplantation genetic diagnosis, donor sperm, donor eggs and surrogate carriers, IVF has literally revolutionized the treatment of infertility.

INFERTILITY BENEFIT PLANS Infertility benefits are offered according to five different treatment plans:

PLAN A—IVF, ICSI and frozen embryo transfer;

PLAN B—IVF with egg donation, ICSI and frozen embryo transfer;

PLAN C—IVF with egg donation, surrogacy, ICSI, and frozen embryo transfer;

PLAN D—Ovulation induction, retrieval, freezing of eggs, ICSI, and frozen embryo transfer PLAN E—PGD (Preimplantation Genetic Diagnosis Each one of the five different treatment plans listed above is offered in either 2-cycles or 4-cycles.

Pricing for 2-cycles and 4-cycles for the five different treatment plans listed above will follow a traditional actuary model.

While the exemplary embodiments have been particularly shown and described with reference to preferred embodiments thereof, it will be understood by those skilled in the art that the preferred embodiments including the first exemplary embodiment have been presented by way of example only, and not limitation. Furthermore, various changes in form and details can be made therein without departing from the spirit and scope of the invention. Thus, the breadth and scope of the present exemplary embodiments should not be limited by any of the above described preferred exemplary embodiments, but should be defined only in accordance with the following claims and their equivalents.

All references cited herein, including issued U.S. patents, or any other references, are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

What is claimed is:

1. A method of providing an insurance policy for treatable infertility, implemented in a computer executable program code residing in a storage medium communicatively coupled to a processor when executed by the processor, the program code causes the processor to perform the method comprising:

initiating by the processor the computer executable program code of the method of providing the insurance policy for treatable infertility;

providing a submission format over a communications network;

pre-negotiating diagnosis and treatment terms over the communication network;

receiving and storing pre-negotiated diagnosis and treatment terms in a dynamic repository;

contracting with a plurality of physicians for performing infertility treatment on a plurality of beneficiaries;

registering a plurality of individuals seeking to participate in the insurance policy for treatable infertility conditions;

storing, in the dynamic repository, personal descriptor data, of the plurality of individuals seeking to participate in the insurance policy for fertility diagnosis and treatable infertility conditions;

determining, in a first determining operation, by the processor, when matching exists between fecundability of the plurality of individuals seeking to participate in the insurance policy for treatable infertility conditions, the plurality of categories of fertility insurance and personal descriptor data of the plurality of individuals seeking to participate in the insurance policy for fertility diagnosis and treatable infertility conditions, wherein when matching of categories of fertility insurance and personal descriptor data is not determined, the computer executable program code causes the processor to continue registering the plurality of beneficiaries and storing additional personal descriptor data in the dynamic repository, wherein the first determining operation includes using a plurality of categories of fertility insurance for the plurality of beneficiaries, and using a knowledge base system, executing one or more algorithms and formulas including a formula obtaining a summation probability of conception (F) by calculating a summation of the probability of conceiving for month 1; added to a function of a probability of conceiving multiplied by a probability of failing to conceive in month 2; added to a function of the probability of conceiving multiplied by a probability of failing to conceive in month 3; added to the function of the probability of conceiving multiplied by a probability of failing to conceive in month N; wherein the formula obtaining a summation probability of conception (F) is characterized as:

$$\Sigma f + fx(1-f) + (1-f)^2 + fx(1-f)^{N-1}$$

wherein "f" is Fecundability, and is the probability of conceiving for month 1;

wherein "fx" is a function of "f" for a short period of time;

wherein "1−f" is a probability of failing to conceive in a menstrual cycle;

wherein "$fx(1-f)^2$" is the probability of conceiving for month 3; and wherein "$fx(1-f)^{N-1}$", is the probability of conceiving for month N;

negotiating, in a second determining operation, based on actuarial tables an age of a beneficiary by one of the processor and an agent of an insurance provider using the processor, infertility treatment and payment terms and conditions with one of the plurality of beneficiaries and an agent and a promissor of any one of the plurality of beneficiaries, when matching of categories of fertility insurance and personal descriptor data is determined in the second determining operation, wherein when negotiating beneficiary treatment and payment terms and conditions are not determined in the second determining operation, the computer executable program code causes the processor to further determine, in the first determining operation, one of whether matching of categories of fertility insurance and personal descriptors exists and further registering beneficiaries and storing personal descriptor data and further determining in the second determining operation, negotiating beneficiary treatment and payment terms;

accepting a contract for the insurance policy for treatable infertility conditions, when negotiating beneficiary treatment and payment terms are determined in the second determining operation; and coordinating, over the communications network, providing fertility diagnosis and infertility treatment to the plurality of beneficiaries by any one or more of the plurality of physicians in a network of infertility treatment providers, wherein coordinating includes collecting payment from the patient and coordinating payment to the physician performing the infertility treatment, and wherein a beneficiary of the plurality of beneficiaries is an infant, upon contracting with a plurality of physicians for performing fertility diagnosis and infertility treatment, and receive benefit of the insurance policy for fertility diagnosis and treatable infertility only when the insurance policy for fertility diagnosis and treatable infertility vests and the beneficiary who is the infant reaches an age of majority.

* * * * *